C. E. VAWTER.
ELECTRICAL MEASURING INSTRUMENT.
APPLICATION FILED JULY 30, 1919.
1,426,619.
Patented Aug. 22, 1922.
3 SHEETS—SHEET 1.
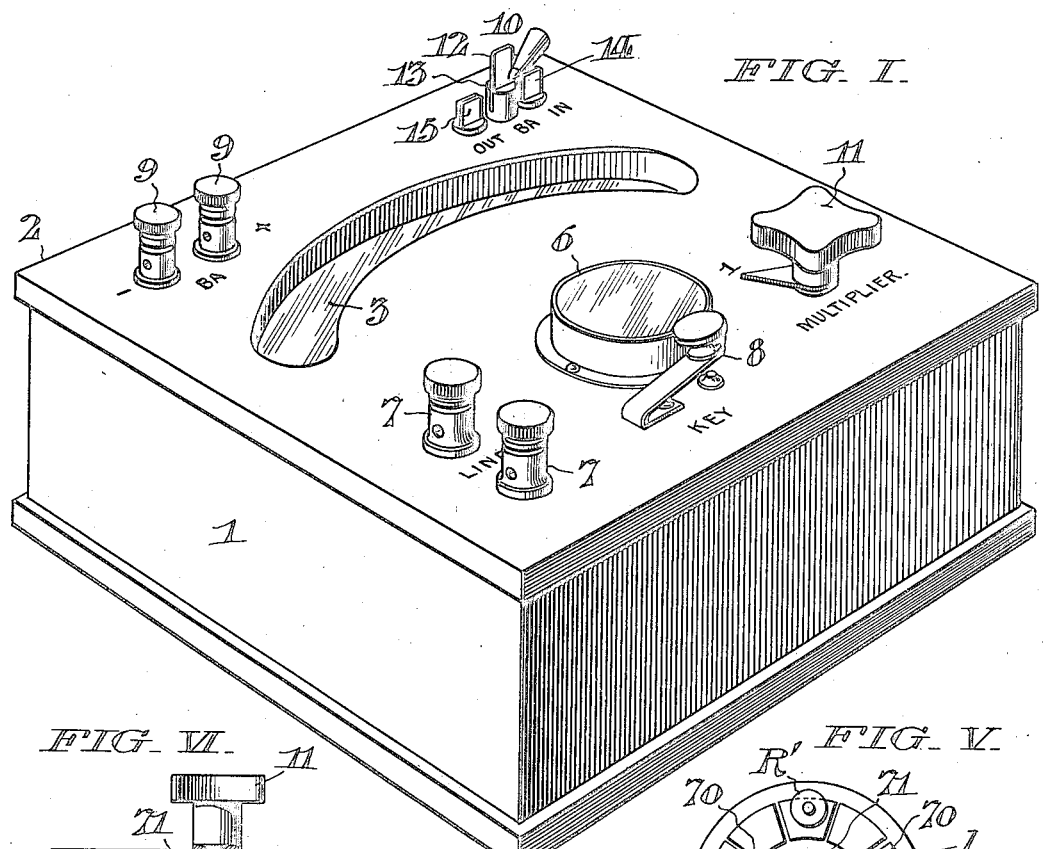
FIG. I.
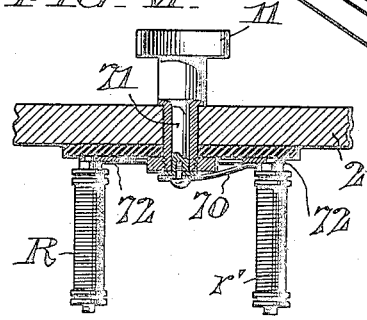
FIG. VI.
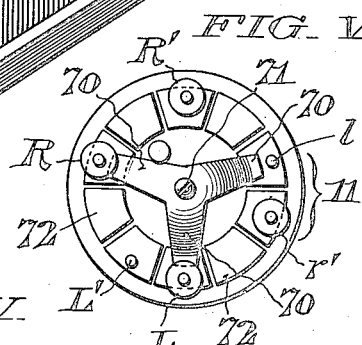
FIG. V.
FIG. IV.
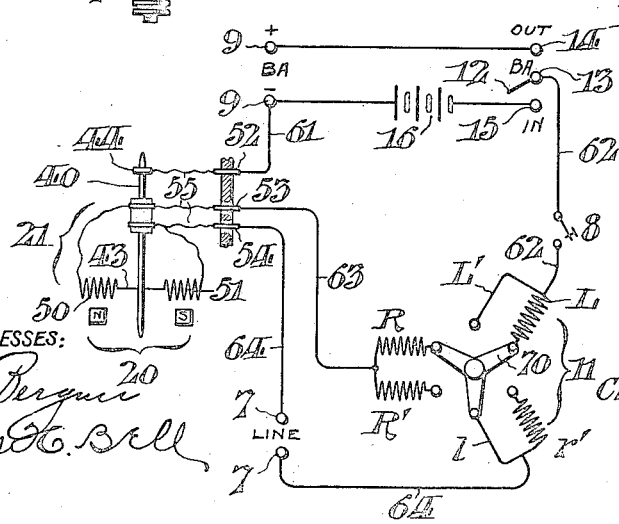
WITNESSES:
John C. Bergin
James H. Bell
INVENTOR:
Charles E. Vawter,
BY Maley & Paul
ATTORNEYS.

C. E. VAWTER.
ELECTRICAL MEASURING INSTRUMENT.
APPLICATION FILED JULY 30, 1919.
1,426,619.
Patented Aug. 22, 1922.
3 SHEETS—SHEET 2.
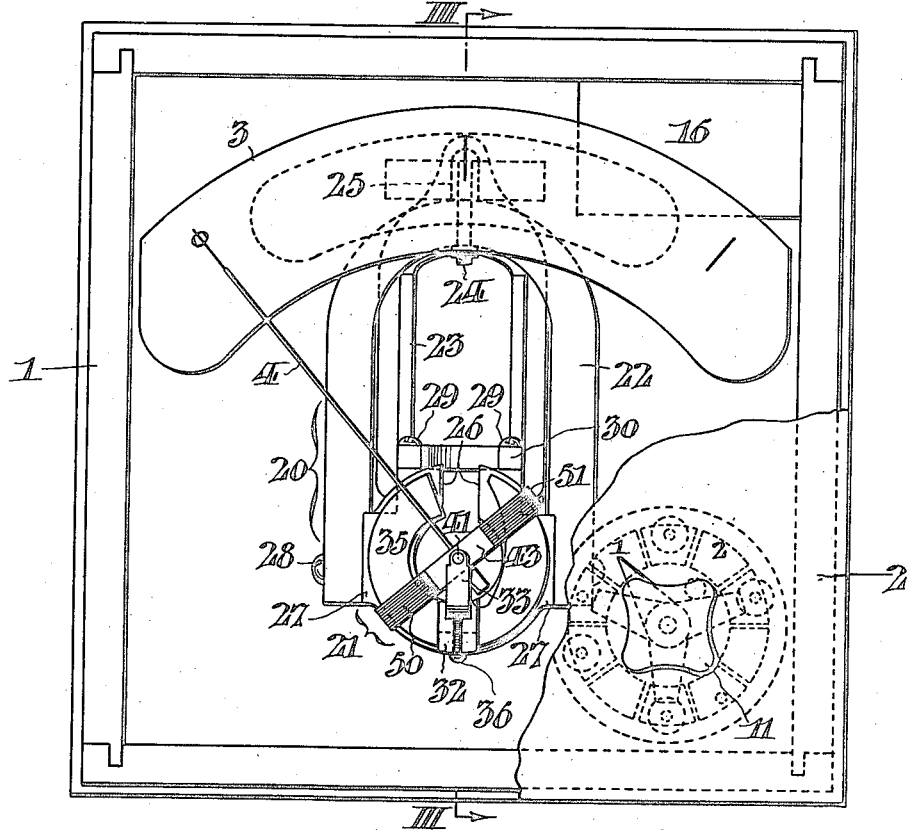
WITNESSES:
INVENTOR:
Charles E. Vawter
ATTORNEYS.

C. E. VAWTER.
ELECTRICAL MEASURING INSTRUMENT.
APPLICATION FILED JULY 30, 1919.
1,426,619.
Patented Aug. 22, 1922.
3 SHEETS—SHEET 3.
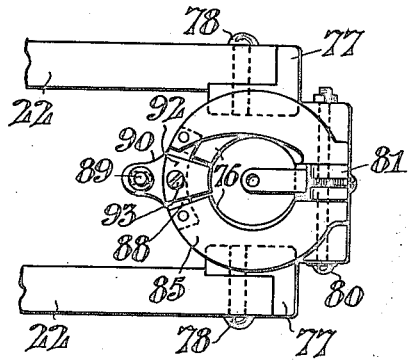
FIG. VII.
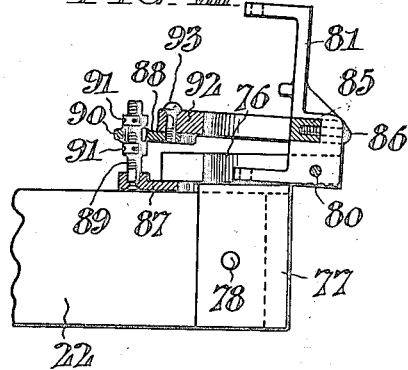
FIG. VIII.
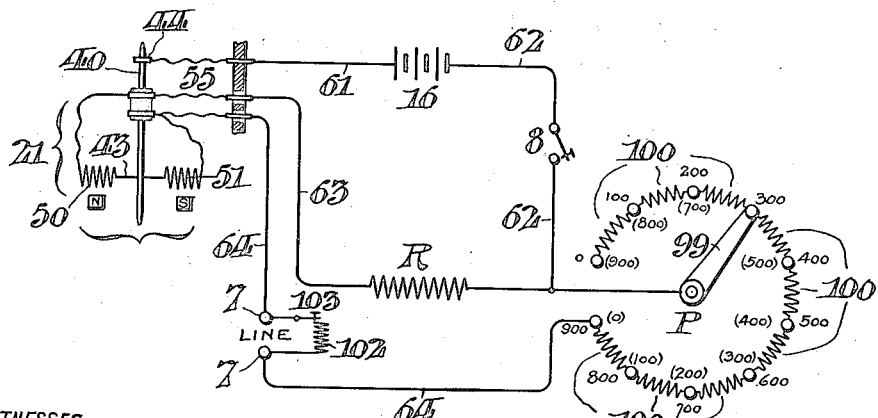
FIG. IX.
WITNESSES:
John C. Bergner
James H. Bell
INVENTOR:
Charles E. Vawter,
BY
ATTORNEYS.

UNITED STATES PATENT OFFICE.

CHARLES E. VAWTER, OF PHILADELPHIA, PENNSYLVANIA.

ELECTRICAL MEASURING INSTRUMENT.

1,426,619.  Specification of Letters Patent.  Patented Aug. 22, 1922.

Application filed July 30, 1919. Serial No. 314,273.

*To all whom it may concern:*

Be it known that I, CHARLES E. VAWTER, citizen of the United States, of Philadelphia, in the county of Philadelphia and State of Pennsylvania, have invented certain new and useful Improvements in Electrical Measuring Instruments, whereof the following is a specification, reference being had to the accompanying drawings.

My invention relates to electrical measuring instruments, and especially to instruments of the ohmmeter type. An instrument constructed in accordance with the invention can be made direct-reading, over a long and uniformly graduated scale, and susceptible of accurate calibration throughout the scale range; moreover, provision can be made in it for adjustments that shall cause the total scale length to correspond with the interval between practically any two desired values whatever,—due regard being paid, of course, to the intrinsic sensibility of the instrument as actually constructed,—and also for securing results such as could ordinarily be obtained only from an instrument with a scale ten or more times the usual length. The readings of the instrument can be made to express directly either resistance or any quantity which is a function of resistance. The accuracy of the instrument can be made independent of all such inherently uncertain factors as voltage deterioration of dry cells, strength of permanent magnets, or the unreliability of springs.

My invention also includes various novel features of construction and combinations and arrangements of parts which are of more or less general utility in electrical measuring instruments of various kinds and types.

How various advantages can be secured in connection with my invention will appear from the description hereinafter of the best embodiment at present known to me, and from a concurrent explanation of certain general considerations, while its scope and essentials will be indicated in my claims.

In the drawings, Fig. I, is a perspective view of an instrument embodying my invention.

Fig. II, is a plan view with the cover removed.

Fig. III, is an elevation showing the instrument in section at a surface corresponding to the line III, III, in Fig. II, the cover being in place.

Fig. IV, is a diagram of the essential operating parts and their connections.

Fig. V, is a detached plan view of an accessory mechanism.

Fig. VI, is a fragmentary elevation, showing an axial section of the mechanism illustrated in Fig. V, certain parts being omitted.

Fig. VII, is a fragmentary plan view illustrating a modified construction for certain parts; and Fig. VIII, is a corresponding elevation with the parts in midsection.

Fig. IX, shows a modified arrangement for enabling the instrument to be used so as to secure the effect of a scale ten times as long as the actual scale.

The instrument shown in Figs. I, II, and III, is enclosed in an external case 1 whose cover 2 has the usual sight opening for observation of the scale 3 and the index or pointer 4 (Figs. II and III), and an opening 5 with elevated crystal 6 that accommodates and renders visible certain operating parts. On this cover 2 are mounted the binding posts 7, 7 (marked "Line") for connecting the instrument to the line or unknown resistance on which measurements are to be made, and the usual leaf-spring reading key 8 (marked "Key"). This key may be of the usual double contact type which includes a high resistance in the battery circuit before finally closing it and short circuiting said resistance. There are also binding posts 9, 9 (marked "BA" and "+" and "—") for connecting the instrument to an outside battery or source of difference of potential and current, when required; a switch device 10 (also marked "BA") controlling the outside connection; and a rotary controller handle 11 equipped with an indicator (marked "multiplier").

The switch device 10 comprises a right angled blade piece 12 provided with an operating handle and pivoted to a terminal 13. To the right of the terminal 13 is a terminal jaw 14 (marked "In"), and to the left is a terminal jaw (marked "Out"). These terminals 13, 14 and 15 are connected to the binding posts 9, 9 and to a battery (or other source of differences of potential and current) 16 enclosed in the case 1 in such a way (see the diagram Fig. IV)

that when the right hand blade 12 connects the contacts 13 and 14, the internal battery 16 is operatively connected with the instrument proper, and that when the left hand blade 12 connects the terminals 13 and 14, the binding posts 9, 9 and the external battery are operatively connected to the instrument proper. It will be understood that in either case the operating connection to the instrument includes the reading key 8.

Coming, now, to the operating parts or mechanism constituting the instrument proper, it will be seen from Figs. II and III that they comprise relatively movable elements 20 and 21 associated with the scale 3 and the pointer 4 respectively, i. e., the instrument is of the relatively movable element type. In this instrument, the element 20 is stationary, and serves the purpose of magnetic field production, while the element 21 carrying the pointer 4 is movable under its influence in such wise that the position of the pointer on the scale 3 may serve as an indication of the magnitude of the resistance X,—or of the function of resistance,—which it is desired to measure. The instrument is, therefore, magnetically controlled.

The element 20, it will be seen, comprises a permanent magnet 22 (of horseshoe shape and of any suitable steel) with its poles side by side horizontally securely fastened to the bottom of the case 1 by means of a base plate 23 (of aluminum or other non-magnetic metal) having a standard 24 to which said magnet is bolted at 25 and on which the scale 3 is mounted. Each pole end of the magnet 22 has a horizontal pole-piece portion 26 of suitable soft iron attached by means of a lug 27 on the pole-piece that extends down at the inner side of the steel magnet end and is screwed thereagainst at 28. Each lug 27 is also secured, by screws 29, to a lug 30 on the base plate 23; and the magnet 22 is thus made firm and rigid thereon.

Each of the pole-pieces 26, it will be seen, is of a curved form such that they are together equivalent to a flat ring with its axis in the median plane of the magnet 22 and with central slices of the same width cut from its two sides at this plane. On them, across their outer gap (speaking with reference to the magnet 22), is mounted and screwed, at 31, a part comprising an upright bracket piece 32 (of brass or other non-magnetic metal) with bearing bracket arms 33 and 34 (which afford a pivotal mounting for the movable element 21) and a soft iron core-piece 35 that fits in a transverse notch in the bracket piece 32 and is secured by a screw 36. The core 35 has, it will be seen, approximately the form of a thin, flat ring,—of about the same inside diameter as the pole pieces 26, 26 taken together, but of slightly less outside diameter,—with a central gap in its inner side (speaking with reference to the magnet 22), so that its two halves or members in plan resemble the pole pieces 26, 26. It is mounted close above the pole pieces 26, 26 in substantial axial coincidence with them and approximate parallelism to them, in magnetically inductive proximity to the magnet 22, and the magnetic flux from pole to pole of the magnet 22 passes across the air gaps between the poles 26, 26 and the core 35 and through the core itself. For reasons which will be explained hereinafter, the core 35 is only approximately parallel to the pole pieces 26, 26, being tilted upward away from them at the air-gap or opening between its members toward the magnet 22.

The movable element 21 above referred to has an upright shaft 40 which is mounted to turn with minimum friction in "jewel" bearings 41 and 42 screwthreaded in the brackets 33 and 34 respectively (one of said bearings, at least, being preferably adjustable) co-axially with the core 35. On this shaft 40 are mounted the counterweighted pointer 4; a "bridge piece" 43 (of brass or other non-magnetic metal); and, as shown, a metal terminal disc 44 and an insulating piece 45 that carries terminal rings 46 and 47. To the ends of the bridge-piece 43 are secured similar electro-magnetic coils 50 and 51 (of suitably fine wire) of such proportions as to surround the core 35 with sufficient clearance to insure perfectly free movement of the element 21.

Adjacent ends of the coils 50 and 51, it will be seen, are attached and electrically connected to the bridge-piece 43 (and so to the shaft 40 and its terminal 44), while the other ends of said coils are attached and electrically connected to the terminal rings 46 and 47. The terminals 44, 46 and 47 are electrically connected, respectively, to suitably insulated terminals 52, 53 and 54 (extending through the upper bearing bracket 33) by means of spiral "trailers" 55 of gold-leaf or the like. These trailers 55 are so proportioned and arranged as to be as nearly as possible "torsionless,"—singly and in the aggregate,—so that they shall exert no appreciable force or influence upon the movement of the element 21. Preferably the pointer 4 extends at right angles to the plane of the coils, as shown.

To the lower bracket 34 is attached a metal cover 56 that has a downward-extending central sleeve 57 and screws into a cylindrical metal casing 58. In the sleeve 57 fits a shaft 59 which carries a paddle 60 in the bottom of the casing and a U-shaped arm 61 that is attached to the shaft 40. The casing 58 is substantially filled with oil, so that the parts constitute a dashpot for giving the instrument an aperiodic or "dead beat" action. The construction of this dashpot with tight cover 56 and sleeve 57 makes it impossible for the oil to spill or leak out.

It will be seen that the parts of the movable electro-magnetically responsive system, or element 21, can be substantially or even accurately balanced about the shaft 40, so as to eliminate all eccentric inertia effects.

Referring, now, to the wiring diagram in Fig. IV, as well as to Figs. II and III, it will be seen that the battery 16 (or other source of difference of potential and current) is operatively connected to the instrument by leads 61 and 62,—of which the former goes directly to the common coil terminal 52, while the latter goes first to the reading key 8, and thence to the multiplier 11. Regarding the multiplier 11, for the moment, as though it were merely a fixed metallic connection, it will be seen that at it the circuit divides. One branch includes a known, definite, fixed resistance measured and identified, as R; a lead 63 connecting it to the terminal 53; and the coil 50. The other branch includes leads 64, 64 having connected between them the binding-posts 7, 7 and connecting to the terminal 54, and the coil 51. The binding-posts 7, 7, conveniently adapt the latter branch to have the resistance X to be measured connected therein, so as virtually to form part thereof; in the absence of any such connection between the binding-posts 7, 7, this branch is an open circuit through which no current flows. The two branches are reunited at the bridge piece 43, which is connected to the terminal 52 (and so to the battery lead 61) as already described.

It will be understood that, by means of the magnet 22, pole-pieces 26, and core 35, there is afforded a magnetic field wholly of one polarity in association with each of the coils 50 and 51. If the left-hand pole of the magnet 22, in Fig. II, be a south pole, the magnetic field of the core 35 will have the character of a north pole at the left of the median plane of the magnet 22 and that of a south pole at the right; and (owing to the tilt or inclination of the core 35 with reference to the pole-pieces 26, 26, and to the gap at the inner side of the core) the strength of the field will diminish toward the left in Fig. III in each half of the core. With relative movement of the elements 20 and 21, therefore, the field strengths affecting the coils 50 and 51 will vary oppositely; and hence (and this is the important point) the ratio of these field strengths will vary. The coils 50 and 51 are so wound and connected that their electromagnetic reactions due to the core field oppose one another and are those of repulsion, so that they tend to produce opposite relative movements of the elements 20 and 21 such as would carry each of the coils in the direction of diminishing effective field strength,—i. e., the coil 50 clockwise in Fig. II, and the coil 51 counterclockwise.

For convenience in discussion, I will now assume, provisionally, that the instrument is so constructed as to simplify to the utmost the mathematical expression or calculation of its action; afterward, I will briefly discuss the more general case when some or all of the provisionally assumed simplifications do not obtain. This mode of presentation is further justified by the fact that the features which simplify calculation and explanation also simplify the construction and manufacture of the instrument very materially.

Assume, then, that the coils 50 and 51 are made substantial counterparts of one another as regards shape and size, number of turns, and electrical resistance, and that they are mounted with their centers at equal radial distances from their axis in the shaft 40. With this construction, the effective electromagnetic strength characteristics of the coils 51 and 50 will be alike. Moreover, the ratio of the effective electromagnetic forces or torques due to currents in the coils 51 and 50 will depend only on the intensities of these currents and on the core field intensities affecting them and will vary directly with these two factors. When the multiplier 11 is included in the instrument, it is desirable that the leads 63 and 64 and the corresponding trailers 55, 55 be so designed that, except for the resistances X and R, the parallel circuits including the coils 51 and 50, respectively, shall be of equal definite, fixed resistance,—say $r$. The total resistance of the parallel circuits will, then, be $r+X$ and $r+R$, and (the circuits being subject to the same difference of potential from the battery 16) the ratio of the currents in them will be $$\frac{r+R}{r+X}.$$

These currents, therefore, are controlled by and correspond to the values of the resistance X to be measured and the fixed, definite control resistance R.

For any value of X within the capacity of the instrument, therefore, the element 21 will take up a position of equilibrium with reference to the element 20 in which the ratio of the magnetic field intensities affecting the coils 51 and 50 is inversely proportional to the ratio of the currents and directly proportional to the ratio $$\frac{r+X}{r+R}$$

of the resistances in the two parallel coil circuits. This position will be one of stable equilibrium; for if the element 21 be displaced therefrom, the torque on one of the coils 50 and 51 tending to return it thereto will increase and that on the other tending to displace it still further in the same direction will diminish,—in consequence of the variation of the field strength in the manner set forth above. It will be evident, furthermore, that the actual position of equilibrium will vary only with the value of X,—because all other factors capable of affecting it are fixed by the construction of the instrument and the fixity of the relative positions of its parts. The position of equilibrium is, in particular, absolutely unaffected by variation in the potential of the battery 16 or in the magnetization of the magnet 22, because such variations alter the absolute values of the currents in the coils 50 and 51 and the magnetic field strengths in the two sides of the core 35 without altering the ratios of these currents and field strengths.

The position of equilibrium of the element 21 with reference to the element 20 as indicated by the position of the pointer 4 on the scale 3 is, therefore, a proper measure of the unknown resistance X or of any quantity which is a function thereof.

It will be apparent, therefore, that the calibration of the instrument and the graduation of the scale 3 can be controlled and adjusted absolutely by proper regulation or proportioning of the intensity of the core flux or field strength from point to point, so as to secure an appropriate curve of variation of relative field strengths affecting the coils 50 and 51 over the range of relative movement of the elements 20 and 21. The variation of the air-gap between the core 35 and the pole-pieces 26, 26 consequent upon the tilt of the core gives rise to a general variation in the core flux and the field strength affecting the coils 50 and 51 such as before noted. Owing to the flatness of the adjacent core and pole piece surfaces, this general variation of flux in the core members is approximately uniform, and varies inversely in reference to the respective coils 50 and 51 with relative movements of the parts 20 and 21. To calibrate the instrument for any desired graduation of the scale 3, therefore, it is only necessary to adjust the tilt of the core properly and to "superpose" on this general variation from point to point (so to speak) a suitable additional component of variation in the nature of a variation of magnetic flux locally and relatively (of the magnetic flux) as between the core members. This last can be done by appropriate local variation, from point to point of the core 35, of any one or more of the factors affecting the core flux and field strength,—such as the air-gap between core and pole-pieces, the width of the core, or its cross-section, etc. The most convenient practical method is to make the core perfectly flat, as shown, and to trim it edgewise.

When the scale 3 is to read resistance, it is convenient to make the fluxes in the two sides of the core 35 equal at a plane perpendicular to the median plane of the magnet 22, so that when $X=R$ the pointer 4 will stand in the middle of its range of movement and of the scale, and it is desirable to vary the flux in the core 35 over the range of movement of the coils 50 and 51 in such a way that the pointer 3 will stand at the extreme left for some value of $X<R$, such as $X=0$, and at the right for some value of $X>R$, such as $X=2R$, and that the scale graduations will be uniform between these values,—in other words, so that the deflection of the pointer 4 from zero is always proportional to the part X of the resistance in the 51 coil branch of the circuit. This last relation requires,—to state the matter in a more general way,—that variations in the relative position of equilibrium of the elements 21 and 20 be directly proportional to variations of part of the resistance in the 51 coil branch of the circuit, and hence inversely proportional to the effective field strengths as affecting the respective coils. In Fig. II is shown a trimming of the core 35 on its inner edge which fulfills these conditions.

The "multiplier" 11 is intended to enable the value of the scale divisions to be varied so as to allow the instrument to cover a wider or narrower range of values: For example, if in the adjustment of the multiplier shown in Fig. IV the scale markings be 0 to 2, then another adjustment of the multiplier may be made to give each main division the value 10 in terms of the original unit, so that the scale will read (and may be secondarily so marked) 0 to 20,—and this without any readjustment other than the turning of the multiplier handle. For this purpose, the multiplier may consist, as shown in Figs. V, and VI, of three conductive resilient contact arms 70, attached to the shaft 71 which carries the handle 11, together with a suitable number of contact segments 72 (electrically insulated from one another) and a plurality of resistances and leads. These latter are connected to the contact segments 72 and the leads 62, 63 and 64 in parallel pairs L and L', R and R', $l$ and $r'$, respectively. As shown in Fig. IV, the arms 70 connect in circuit the lead $l$ (in effect a mere part or extension of the lead 64) and the resistances L and R. By turning the handle 11 and the shaft 71 clockwise (in Figs. I and IV), the arms 70 will be shifted to cut out of circuit L, R and $l$, and substitute for them the lead L' (in effect a mere part or extension of the lead 62) and the resistances R' and $r'$. The definite, fixed resistances of the parallel coil circuits are now $r+r'$, where $r$ indicates the additional resistance introduced into the circuit by turning the handle 11, and $r$ indicates the fixed resistance of the circuit excluding the portion $r'$ and $r+R'$, respectively, instead of $r$ and $r+R$. If, however, the resistances $r'$ and $R'$ be so designed as to have the values $r'=9r$ and $R'=10R+9r$, the definite, fixed resistances of the parallel coil circuits will have the values $10r$ and $10r+10R$ in other words, they have been concurrently altered in the same proportion. Hence the midscale position of the pointer 4 indicates a value 10 R for the resistance being measured,—and the ratio of the total resistances in the two coil circuits is $$\frac{10r+10X}{10r+10R}=\frac{r+X}{r+R}.$$

Thus the scale graduations now have ten times their primary, marked absolute value, but remain entirely unaffected as regards the correctness of their positions and their relative values.

L and L' have thus far been tacitly regarded as mere extensions of the lead 62, since (being in the main circuit across the battery terminals in series with the parallel coil circuits) they cannot affect the action of the instrument as just described. As a matter of fact, L' is a mere lead, while L is a resistance cut out of or into the main battery circuit concurrently with the cutting out or in of R and in or out of $r'$, so as to obviate variation of the total resistance across the battery to a certain extent and prevent the unnecessary "banging" of the pointer 4 that might otherwise result from the sudden change in the currents in the coils 50 and 51.

Obviously the multiplier 11 may be made to give any desired series of multiplications (as 10, 100, 1000) by the provision of suitable resistances.

Figs. VII and VIII show a convenient construction and arrangement of pole pieces, core, and associated parts providing for easy, flexible, and accurate adjustment of the field strength curve to meet the requirements of instruments for widely different purposes. As here shown, the pole pieces 76, 76 have lugs 77, 77 secured to the poles of the magnet 22 by screws 78, 78, and themselves differ from the pole pieces 26, 26, in having their "inner" ends cut off on radial planes. The outer ends of said pole pieces 76, 76 are widened and shouldered to receive a screw bolt 80, which also extends through a bracket piece 81 (of brass or other non-magnetic metal) and serves as a pivot therefor. This bracket 81 has a notch which receives the thickness of the pole piece 85. The pole piece 85 has lugs that engage on either side of the bracket 81, and the parts are thus definitely inter-engaged in proper relation, and secured by means of a screw 86.

To the inner ends of the pole pieces 76, 76 and of the core halves or members, on their lower sides or faces are screwed similar bracket pieces 87 and 88 (of brass or other non-magnetic metal), and in a lug on the bracket piece 87 is fixed a screw stud 89 that extends through a hole in a corresponding lug 90 on the bracket 88 with considerable clearance, so that advantage may be taken of the pivotal core mounting at 80 to tilt the part comprising the upright bracket piece 81 and the core 85 to any desired inclination with reference to the pole pieces 76, 76. By means of suitable nuts 91, 91 on the screw stud 89 which engage the bracket 90, the core 85 can be tiltingly adjusted and securely and accurately set at the exact inclination desired,—spherical faces on the lug 90 facilitating this. By this adjusting screw means, the core tilt and the general variation (or approximately uniformly-varying component) of core flux referred to above can be regulated and adjusted to a nicety.

On the upper surface of the bracket piece 89, in the air-gap of the core 85, a supplemental core segment 92 (of the same metal and thickness as the core 85) is secured by a screw 93,—the hole in the part 92 for the screw 93 preferably allowing very considerable clearance or play. This segment 92 acts as a bridge connection or shunt for the magnetic flux across the air-gap between the halves or members of the core 85, which is shown as trimmed much like that in Figs. II and III. By setting the screw 93 with the bridge piece 92 in contact with either end of the core 85, or in a suitable intermediate position this shunt and the "superposed" component of core flux and field strength variation referred to above can be regulated and adjusted locally and relatively as between the core members.

By these two simple adjustments of core tilt and core segment or bridge connection, practically any desired field strength curve can be obtained, and the same instrument can be adjusted to such varying requirements, even as to the direct reading on uniformly graduated scales of resistance and of other quantities of which resistance is a function (e. g., temperature indications of a resistance pyrometer).

In commercial instruments of portable type, it is found impracticable to make the scale of sufficient length to permit the direct reading of more than two significant figures, —unless, of course, the range of the instrument be exceedingly limited. With my instrument, however, it is possible, with a very simple accessory device, to supplement the reading of the scale in such way as to permit three significant figures to be obtained directly, thus making the instrument equivalent to an ordinary one with ten times its actual scale length. Fig. IX is a wiring diagram (corresponding to Fig. IV) showing how this can be done. It will be understood that in this diagram the parts 9 to 15 of Fig. IV are omitted for the sake of simplification, and that parts corresponding to and virtually identical with those in Fig. IV are marked with the same reference characters.

For the sake of simplicity, the instrument is here shown without any equivalent for the "multiplier" 11. The resistance R is, therefore, fixedly connected in the 50 coil branch circuit, and a rheostat P is included in the 51 branch that has the terminals 7, 7 for the connection thereinto of the resistance X to be measured. The definite fixed resistance of the parallel circuits exclusive of R, X, and P (i. e., when the rheostat arm 99 is in position to cut out all the rheostat coils 100) being made equal, as before, and again called $r$, and the rheostat resistance at any time cut into the circuit being called P, the resistances in the 51 and 50 branches will be, respectively $r+P+X$ and $r+R$; and their ratio will be $$\frac{r+P+X}{r+R}.$$

If the instrument be so designed that $r=100$ ohms and $R=950$ ohms, then $r+R=1050$ ohms. Hence (still assuming that arm 99 cuts out all the coils 100, so that $P=0$), the mid-scale position of the pointer 4 indicates $X=950$ ohms; the left hand extreme or "zero" position indicates $X=900$ ohms; and (the instrument being suitably calibrated) the right hand extreme position indicates $X=1000$ ohms.

Assume, however, that the scale 3 is graduated from zero at the left to 50 at the middle and 100 at the right, and that each of the coils 100 is of 100 ohms resistance, so that for the contact positions of the arm 99 marked 900, 800, 700, etc., to 0 on the rheostat face, the actual rheostat resistances in circuit (and the values of P in our formula) are (as marked in parenthesis on the drawing) 0, 100, 200, etc., to 900 ohms. The resistance X to be measured being connected across the terminals 7, 7 and the arm 99 standing at "900", it is evident that if $X>900<1000$, its excess over 900 ohms can be read on the scale; if $X>1000$, the pointer 4 will move off the scale to the right; if $X<900$, the pointer 4 will stand at zero or to the left thereof. If, now, the arm 99 be moved counterclockwise, step by step, the pointer 4 will evidently continue to stand at zero until a position is reached for which $X+P>900$, when the pointer 4 will correctly indicate on the scale 3 the number of ohms (less than 100) by which X exceeds the corresponding rheostat-face reading; thus, if a scale reading is obtained with arm 99 in the position shown in the drawing, it means that $X>300$ by the amount read. Hence the tens and units figures of the value of X can always be read directly on the scale, and whenever $X>100<1000$, the hundreds figure can be read directly on the rheostat face. If $X>1000$, the direct reading capacity of the instrument is exceeded; but by connecting a 1000 ohm resistance 102 across the terminals 7, 7 in shunt with X by means of the key 103, three-figure readings can still be obtained just as before, and the value of X calculated therefrom by Ohm's law, according to the usual practice.

It will be observed that in this form of instrument illustrated in Fig. IX, the part of the resistance in the 51 coil circuit to which variations in the position of equilibrium of the pointer 4 are proportional is not simply X, as in Fig. IV, but $P+X$.

It was assumed, at the outset of the foregoing discussion of the operation of the instrument, that the effective electromagnetic strength or torque characteristics of the coils 50 and 51 were made alike,—by making these coils of the same shape and number of turns and giving them equal lever-arms, etc. It will now be evident, however, that coils of any relative electromagnetic strength characteristics will always assume the same position in the core field for currents of the same ratio, and hence that similarity of electromagnetic strength characteristics is not essential to an instrument embodying my invention in its broader aspects. Likewise, it will be seen that the magnetic field strength affecting one of the coils 50 and 51 need not necessarily vary at all if that affecting the other be properly adjusted from point to point, since variation of the field strength affecting one coil entails, in such a case, variation in the ratio of the field strengths.

Having thus described my invention I claim:

1. In an instrument of the class described, means for producing a magnetic field, a pair of rigidly united coils movable in said field, one of said coils being adapted to be connected in circuit with a resistance to be measured, a pointer secured to said coils, a scale with which said pointer co-operates, means for producing a predetermined distribution of the magnetic field, and means for adjusting the intensity of the magnetic flux along the path of movement of said coils, after the parts are assembled, whereby the instrument may be properly calibrated.

2. In an instrument of the class described, means for producing a magnetic field, a pair of coils movable in said field, one of said coils being adapted to be connected in circuit with a fixed resistance and the other coil being adapted to be connected in circuit with a resistance to be measured, means for applying an identical electro-motive force to each of said circuits, whereby the ratio of the currents traversing said coils is dependent upon the magnitude of the resistance under measurement, means for producing a predetermined distribution of the magnetic field, and means for adjusting the magnetic flux along the path of movement of said coils.

3. In an instrument of the class described, means for producing a magnetic field, a pair of rigidly united coils movable in said field, one of said coils being adapted to be connected in circuit with a resistance to be measured, and the other coil being adapted to be connected in circuit with a known resistance, a member of magnetic material positioned within said field and shaped to produce a predetermined unsymmetrical distribution of the magnetic flux, and means for altering the position of said member to regulate said flux.

4. In an instrument of the class described, a permanent magnet for producing a magnetic field, a core of magnetic material positioned within said field and having a pair of arms shaped to produce a predetermined distribution of the magnetic flux, a pair of rigidly connected opposing coils surrounding the respective arms of said core and movable about a common axis in the magnetic field, and means for tilting said core relative to the magnet to effect regulation of the magnetic flux through said arms.

5. In an instrument of the class described, a magnet for producing a magnetic field, a pair of rigidly united coils movable in said field one of said coils being adapted to be connected in circuit with a resistance to be measured, and the other coil being adapted to be connected in circuit with a fixed resistance, a member of magnetic material positioned within said field and shaped to produce a predetermined distribution of the magnetic flux, and means for altering the relative position of said member and magnet to regulate the magnetic flux.

6. In combination with an ohmmeter instrument comprising means for producing a magnetic field, a member of magnetic material positioned within said field and shaped to produce a predetermined distribution of the magnetic flux, means for altering the relative position of said member and magnet to regulate the magnetic flux, a pair of coils movable in the magnetic field and adapted to be connected in circuit, respectively, with a definite fixed resistance and a resistance to be measured, means associated with the respective coil circuits for simultaneously altering the magnitudes of the fixed resistances in said circuits by predetermined amounts bearing a definite relation to each other, whereby the total scale range of the instrument my be changed.

7. In combination with an ohmmeter instrument comprising means for producing a magnetic field, a member shaped to produce a predetermined distribution of the magnetic flux, means of altering the relative position of said member and magnet to regulate the magnetic flux, a pair of coils movable in the magnetic field and adapted to be connected in circuit, respectively, with a definite fixed resistance and a resistance to be measured, said circuits having a portion in common, a source of electro-motive force in said common portion, means associated with the respective coil circuits for simultaneously altering the magnitudes of the fixed resistances in said circuits by predetermined amounts bearing a definite relation to each other, whereby the total scale range of the instrument may be changed, and means for adjusting the resistances in the common portion of said circuits simultaneously with the change of resistance in the respective coil circuits, whereby the total fixed resistance in circuit with the said source of electro-motive force may be controlled to a predetermined value.

8. In combination with an ohmmeter instrument comprising means for producing a magnetic field a member shaped to produce a predetermined distribution of the magnetic flux, means for altering the relative position of said member and magnet to regulate the magnetic flux, a pair of coils movable in the magnetic field and adapted to be connected in circuit, respectively, with a definite fixed resistance and the resistance to be measured, said circuits having a portion in common, means associated with the respective coil circuits for increasing the scale range of the instrument by a given multiple, comprising means for adding to the circuit containing the resistance under measurement of a resistance equal to the product of the fixed resistance of this circuit by said multiple decreased by one, and for simultaneously adding to the other coil circuit a resistance equal to the product of the fixed resistance of this circuit by said multiple decreased by one, and at the same time altering the resistance in the common portion of said circuits so that the total fixed resistance in circuit with said source of electro-motive force may be definitely controlled.

9. In an ohmmeter instrument the combination of relatively movable elements, one comprising a pair of coils and the other comprising a permanent magnet adjacent the coils and an iron core within the coils in magnetically inductive proximity to said magnet, the core being specially shaped for the purpose of obtaining a desired flux distribution and having a gap, an adjustable magnetic connection across said gap for the purpose of adjusting the magnetic field, and means for connecting said coils in circuits subject only to the same difference of potential, one of said circuits being of definite fixed resistance, and the other being adapted to have connected therein the resistance to be measured, and otherwise being of definite, fixed resistance.

10. In combination with an ohmmeter instrument comprising means for producing a magnetic field, a pair of coils movable in the magnetic field and adapted to be connected in circuit, respectively, with a definite fixed resistance and a resistance to be measured, means associated with the respective coil circuits for simultaneously altering the magnitudes of the fixed resistances in said circuits by predetermined amounts bearing a definite relation to each other, whereby the total scale range of the instrument may be changed.

11. In combination with an ohmmeter instrument comprising means for producing a magnetic field, a pair of coils movable in the magnetic field and adapted to be connected in circuit, respectively, with a definite fixed resistance and a resistance to be measured, said circuits having a portion in common, a source of electro-motive force in said common portion, means associated with the respective coil circuits for simultaneously altering the magnitudes of the fixed resistances in said circuits by predetermined amounts bearing a definite relation to each other, whereby the total scale range of the instrument may be changed, and means for adjusting the resistances in the common portion of said circuits simultaneously with the change of resistance in the receptive coil circuits, whereby the total fixed resistance in circuit with the said source of electro-motive force may be adjusted to a predetermined value.

12. In combination with an ohmmeter instrument comprising means for producing a magnetic field, a pair of coils movable in the magnetic field and adapted to be connected in circuit, respectively, with a definite fixed resistance and a resistance to be measured, said circuits having a portion in common, means associated with the respective coil circuits for increasing the scale range of the instrument by a given multiple, comprising means for adding to the circuit containing the resistance under measurement a resistance equal to the product of the fixed resistance of this circuit by said multiple decreased by one, simultaneously adding to the other coil circuit a resistance equal to the product of the fixed resistance of this circuit by said multiple decreased by one, and at the same time altering the resistance in the common portion of said circuits so that the total fixed resistance in circuit with said source of electro-motive force may be controlled.

13. In an instrument of the class described, the combination with a magnet having pole pieces with surfaces in a common plane, of a core lying substantially parallel with such plane, said core being spaced from said pole pieces and disposed in overlapping relation, so as to constitute a magnetic bridge between them, and a moving coil system mounted to traverse the magnetic field formed between said core and pole pieces.

14. In an instrument of the class described, the combination with a magnet having pole pieces with surfaces in a common plane, of a core lying substantially parallel with such plane, said core being spaced from said pole pieces and disposed in overlapping relation, so as to constitute a magnetic bridge between them, a moving coil system mounted to traverse the magnetic field formed between said core and pole pieces, and means for adjusting said core relative to said pole pieces, whereby the strength of said field along the path of travel of said coil system may be varied.

15. In an instrument of the class described, the combination with a magnet having curved pole pieces with their upper surfaces lying in a common horizontal plane, of an annular core having a gap, and conforming substantially to the curvature of said pole pieces, said core bridging the space between said pole pieces and serving to conduct the magnetic flux from one to the other, but itself being spaced from said pole pieces and disposed above the same in overlapping relation, and a coil surrounding said core and mounted to swing about an axis concentric therewith.

In testimony whereof, I have hereunto signed my name at Philadelphia, Pennsylvania, this 25th day of July, 1919.

CHARLES E. VAWTER.

Witnesses:
JAMES H. BELL,
E. L. FULLERTON.